United States Patent Office 2,873,206
Patented Feb. 10, 1959

2,873,206

PROCESS FOR THE OPTICAL BRIGHTENING OF POLYESTER FIBERS

Wilhelm Geigy, Binningen, and Eduard Weber, Basel, Switzerland, assignors to Ciba Limited, Basel, Switzerland, a Swiss firm No Drawing. Application December 14, 1956
Serial No. 628,241

Claims priority, application Switzerland
December 20, 1955

8 Claims. (Cl. 117—33.5)

This invention relates to a process for the optical brightening of polyester fibers.

The invention is based on the observation that polyester fibers can be optically brightened in a particularly favorable manner when these fibers are treated in an aqueous medium at temperatures of a maximum of 75° C. with such brightening agents as are free from water-solubilizing groups and contain at least one heterocyclic ring condensed with a benzene ring, and the fibers are subsequently subjected to a dry heat treatment at temperatures above 100° C.

As polyester fibers there are concerned in connection with the present process primarily such as are produced from polyesters of terephthalic acid and glycol.

As indicated above, the brightening agents to be used in the present process must be free from water-solubilizing groups such as carboxylic acid groups and sulphonic acid groups and must contain at least one heterocyclic ring condensed with a benzene ring, preferably a heterocyclic ring with five ring members, for example an oxazole or imidazole ring. Especially good results are as a rule obtained with such compounds of this constitution as contain two such azole rings attached together in their 2-positions (also called $\mu$-positions) by way of a bridge member, the latter and the azole rings forming a continuous chain of conjugated double bonds, as is the case for example with the $\alpha$:$\beta$-di-[benzoxazolyl-(2)]-ethylene compounds and the $\alpha$:$\beta$-di-[benzimidazyl-(2)]-ethylene compounds.

In the present process the polyester fibers are treated in an aqueous medium with the brightening agents. Since the latter are mostly very difficulty soluble, it is to be recommended to provide by suitable means for a fine state of distribution, for example by addition of surface-active substances (dispersing agents) or by dissolving the brightening agent in an organic solvent soluble in or miscible with water and by adding the resulting solution to the aqeous treatment bath. Suitable dispersing agents are, for example, ethylene oxide addition products with alkyl phenols, or alkyl-aryl sulphonates.

The treatment of the polyester fibers with the brightening agent can consist, for example, in impregnating the fibers with the aqueous preparation at temperatures below 75° C., for example at room temperature. By the term "impregnation" is to be understood in this case, as is customary, a wetting of the fibers with the preparations of the specified constitution, which normally only requires a short time which would be insufficient for the fixation of the brightening agent. For example, the aqueous preparations can be sprayed upon fabric of polyester fibers or, as is especially advantageous, fabric of polyester fibers treated on the foulard with the aqueous preparations.

Instead of impregnating the polyester fibers in the specified manner, it is also possible to work according to the so-called exhaust process, in which, preferably at temperatures of 60–75° C., the optical brightening agent is applied to the polyester fibers in a dilute bath, the latter being gradually exhausted and this operation, as compared with the impregnation method, requiring a longer time.

The quantity of the optical brightening agent is determined by the desired brightening effect, account being taken of the fact that as a rule obviously higher concentrations are required in the impregnation process than in the exhaust process.

According to the invention, the polyester fibers pretreated with the aqueous preparations, are subjected to a dry heat treatment at temperatures above 100° C., in which operation it is in general to be recommended that the fibrous material be first dried at a moderately elevated temperature, for example at least 60° C. but below 100° C. The heat treatment in the dry condition then follows advantageously at temperatures between 120 and 225° C., for example by heating in a drying chamber, by ironing within the specified temperature range or also by treating with dry, superheated steam. The drying and dry heat treatment can also be carried out in an immediately consecutive manner or combined in a single working operation.

By treatment according to the present process, as a rule there is produced on the polyester fibers a strong brightening effect which is at least equivalent to that obtained by the customary exhaust process at temperatures of about 100° C.

The following examples illustrate the invention, the parts and percentages being by weight:

Example 1

A fabric of polyester fibres ("Terylene" or "Dacron," registered trademarks) is impregnated at room temperature on the foulard with a solution containing in 1000 parts of water 0.6 part of the optical brightening agent of the formula

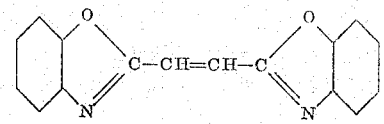

and 1.2 parts of the reaction product of 8 mols of ethylene oxide upon 1 mol of p-tertiary octyl phenol. The fabric is squeezed out to a liquid content of 80% and the excess liquid is returned to the foulard bath. Thereupon, the fabric is dried for ½ hour at 60° C. and after drying subjected for 10 minutes to a further heat treatment at 130° C. In this manner a brightening effect is obtained of the same order as in the application of the same quantity of this brightening agent in a boiling bath.

Instead of the brightening agent of the above formula, the compound of the formula

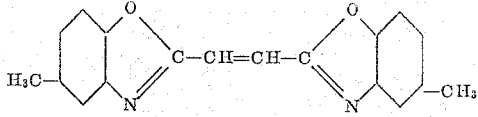

can also be used.

Example 2

0.1 part of $\alpha$:$\beta$-di-[5-methyl-benzoxazolyl-(2)]-ethylene is dissolved in 20 parts by volume of dioxane and the solution diluted with 80 parts by volume of ethyl alcohol.

Polyester fibers, for example of "Dacron," are treated at a bath ratio of 1:30 during 30 minutes at 60–75° C. in a bath containing per liter 30 cc. of the above solution and 1 cc. of ammonia, then rinsed and dried. The dry material is then subjected to a heat treatment at 220° C. for 15 seconds. The material treated in this manner has a whiter appearance than material which has not been subjected to subsequent heat treatment. With the same good result, the heat treatment can also be carried out for 5 minutes at 165° C.

Instead of the brightening agent used above, also other dibenzoxazolyl derivatives or dibenzimidazolyl derivatives, for example α:β-[N-methyl-benzimidazolyl-(2)]-ethylene can be used, in which case also the heat treatment causes an increase of the brightening effect.

What is claimed is:

1. A process for the optical brightening of polyester fibers, which comprises applying to these fibers in an aqueous medium at a temperature of a maximum of 75° C. in the presence of a surface-active substance a brightening agent which is free from water-solubilizing groups and contains at least one heterocyclic ring condensed with a benzene ring, and then subjecting the fibers to a dry heat treatment at a temperature above 100° C.

2. A process for the optical brightening of polyester fibers, which comprises impregnating these fibers at a temperature maximum of 75° C. in the presence of a surface-active substance with an aqueous bath containing a brightening agent which is free from water-solubilizing groups and contains at least one heterocyclic ring condensed with a benzene ring, and then subjecting the fibers to a dry heat treatment at a temperature above 100° C.

3. A process for the optical brightening of polyester fibers, which comprises impregnating these fibers at room temperature on a foulard in the presence of a surface-active substance with an aqueous bath containing a brightening agent which is free from water-solubilizing groups and contains at least one heterocyclic ring condensed with a benzene ring, and then subjecting the fibers to a dry heat treatment at a temperature above 100° C.

4. A process for the optical brightening of polyester fibers, which comprises impregnating these fibers at room temperature on a foulard in the presence of a reaction product of ethylene oxide upon para-tertiary octyl phenol with an aqueous bath containing the optical brightening agent of the formula

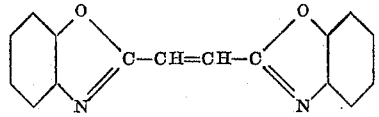

and then subjecting the fibers to a dry heat treatment at a temperature ranging from 120–225° C.

5. A process for the optical brightening of polyester fibers, which comprises impregnating these fibers at room temperature on a foulard in the presence of a reaction product of ethylene oxide upon para-tertiary octyl phenol with an aqueous bath containing the optical brightening agent of the formula

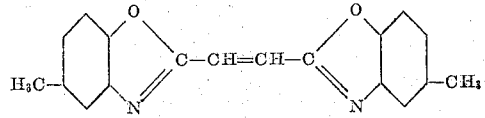

and then subjecting the fibers to a dry heat treatment at a temperature ranging from 120–225° C.

6. A process for the optical brightening of polyester fibers, which comprises applying to these fibers by the exhaust process from a dilute bath at a temperature of 60–75° C. in the presence of a surface-active substance a brightening agent which is free from water-solubilizing groups and contains at least one heterocyclic ring condensed with a benzene ring, and then subjecting the fibers to a dry heat treatment at a temperature above 100° C.

7. A process for the optical brightening of polyester fibers, which comprises applying to these fibers by the exhaust process from a dilute bath at a temperature of 60–75° C. in the presence of a reaction product of ethylene oxide upon para-tertiary octyl phenol the brightening agent of the formula

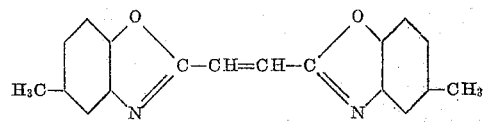

and then subjecting the fibers to a dry heat treatment at a temperature ranging from 120–225° C.

8. A process for the optical brightening of polyester fibers, which comprises applying to these fibers by the exhaust process from a dilute bath at a temperature of 60–75° C. in the presence of a reaction product of ethylene oxide upon para-tertiary octyl phenol the brightening agent of the formula

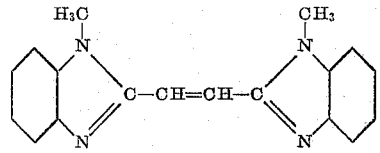

and then subjecting the fibers to a dry heat treatment at a temperature ranging from 120–225° C.

References Cited in the file of this patent
UNITED STATES PATENTS

| | | |
|---|---|---|
| 2,483,392 | Meyer et al. | Oct. 4, 1949 |
| 2,649,385 | Kendall et al. | Aug. 18, 1953 |